United States Patent
Ayabe et al.

(10) Patent No.: US 10,100,173 B2
(45) Date of Patent: Oct. 16, 2018

(54) RESIN ADDITIVE MASTERBATCH AND POLYOLEFIN RESIN COMPOSITION TO WHICH SAID RESIN ADDITIVE MASTERBATCH HAS BEEN ADMIXED

(71) Applicant: ADEKA CORPORATION, Tokyo (JP)

(72) Inventors: Takashi Ayabe, Saitama (JP); Kenji Yamashita, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 16 days.

(21) Appl. No.: 14/780,841

(22) PCT Filed: Mar. 7, 2014

(86) PCT No.: PCT/JP2014/056062
§ 371 (c)(1),
(2) Date: Sep. 28, 2015

(87) PCT Pub. No.: WO2014/156572
PCT Pub. Date: Oct. 2, 2014

(65) Prior Publication Data
US 2016/0053086 A1 Feb. 25, 2016

(30) Foreign Application Priority Data
Mar. 29, 2013 (JP) ................................. 2013-074384

(51) Int. Cl.
| | |
|---|---|
| C08K 5/3435 | (2006.01) |
| C08K 5/134 | (2006.01) |
| C08K 5/523 | (2006.01) |
| C08K 3/34 | (2006.01) |
| C08L 23/12 | (2006.01) |
| C08J 3/22 | (2006.01) |
| C08K 5/3475 | (2006.01) |
| C08K 5/527 | (2006.01) |

(52) U.S. Cl.
CPC ............. *C08K 5/3435* (2013.01); *C08J 3/226* (2013.01); *C08K 3/34* (2013.01); *C08K 3/346* (2013.01); *C08K 5/134* (2013.01); *C08K 5/3475* (2013.01); *C08K 5/523* (2013.01); *C08K 5/527* (2013.01); *C08J 2423/02* (2013.01); *C08J 2423/12* (2013.01)

(58) Field of Classification Search
CPC .. C08J 3/22; C08L 23/00; C08L 23/10; C08K 5/0083; C08K 5/098; C08K 5/3435; C08K 5/3475; C08K 3/22; C08K 3/226; C08K 3/34
See application file for complete search history.

(56) References Cited

U.S. PATENT DOCUMENTS

| | | | | |
|---|---|---|---|---|
| 5,053,444 A | * | 10/1991 | Trotoir | ..................... C08J 3/226 523/351 |
| 7,084,197 B2 | * | 8/2006 | Chin | ..................... B82Y 30/00 524/100 |
| 2002/0156171 A1 | | 10/2002 | Drewniak et al. | |
| 2010/0093899 A1 | * | 4/2010 | Saitou | ..................... C08J 3/226 524/99 |
| 2014/0378586 A1 | | 12/2014 | Ayabe et al. | |

FOREIGN PATENT DOCUMENTS

| | | |
|---|---|---|
| JP | 9-227734 A | 9/1997 |
| JP | 2001-302809 A | 10/2001 |
| JP | 2002-69204 A | 3/2002 |
| JP | 2003-165847 A | 6/2003 |
| JP | 2004-210987 A | 7/2004 |
| JP | 2008-189822 A | 8/2008 |
| JP | 2012-87310 A | 5/2012 |
| JP | 2013-40261 A | 2/2013 |
| WO | WO 2013/114652 A1 | 8/2013 |

OTHER PUBLICATIONS

Uniqema (Atmer 163 Safety Data Sheet. UNIQEMA, Sep. 2004, 7 pages).*
Japanese Office Action, dated Jun. 7, 2016, for Japanese Application No. 2013-074384.
International Search Report, issued in PCT/JP2014/056062, dated May 27, 2014.

* cited by examiner

*Primary Examiner* — Brieann R Johnston

(74) *Attorney, Agent, or Firm* — Birch, Stewart, Kolasch & Birch, LLP

(57) ABSTRACT

Provided is an additive masterbatch comprising a low-melting-point resin additive at a high concentration, which additive masterbatch can be continuously produced without strand breakage, shows excellent clumping resistance to inhibit bleeding from a pellet thereof and thus has few use restrictions for potential application.

The resin additive masterbatch is characterized by comprising, with respect to 100 parts by mass of (A) a polyolefin resin: 50 to 200 parts by mass of (B) a resin additive having a melting point of not higher than 65° C.; and 10 to 20 parts by mass of (C) an inorganic layered compound.

13 Claims, No Drawings

RESIN ADDITIVE MASTERBATCH AND POLYOLEFIN RESIN COMPOSITION TO WHICH SAID RESIN ADDITIVE MASTERBATCH HAS BEEN ADMIXED

TECHNICAL FIELD

The present invention relates to a resin additive masterbatch and a polyolefin resin composition comprising the same (hereinafter, also simply referred to as "masterbatch" and "resin composition", respectively). More particularly, the present invention relates to: a polyolefin masterbatch which comprises a resin additive having a melting point of not higher than 65° C. at a high concentration; and a polyolefin resin composition comprising the same.

BACKGROUND ART

Resin additives such as phenolic antioxidants, ultraviolet absorbers and hindered amine compounds are generally known to inhibit deterioration of organic matters such as synthetic resins caused by light and heat.

Generally, a compound to be used as a resin additive is preferably one which has a high melting point and shows limited resin plasticization and evaporation from a resin, such as tetrakis(3-(3,5-di-tert-butyl-4-hydroxyphenyl)propionyloxymethyl)methane or tris(2,4-di-tert-butylphenyl) phosphite. However, an additive having an excessively high molecular weight cannot move in a resin, so that its stabilizing effect tends to be small.

Meanwhile, low-melting-point compounds such as stearyl (3,5-di-tert-butyl-4-hydroxyphenyl)propionate and bis(2,2,6,6-tetramethylpiperidyl)sebacate have relatively low molecular weight and thus exhibit excellent initial stabilizing effect; however, since they readily evaporate from a resin, their long-term stabilizing effect is poor. In addition, those compounds that are in a liquid, viscous or powder form adhere with each other to generate large aggregates or the like during storage and are thus poor in terms of the ease of handling; therefore, in order to improve the ease of handling, these compounds are required to be masterbatched.

However, when an ordinary resin additive such as a hindered amine compound or a benzoate compound is incorporated into a polyolefin resin, because of the low compatibility of the additive with the resin, in the preparation of a masterbatch comprising such a resin additive at a high concentration, there occurs a condition where the hindered amine compound or benzoate compound bleeds out to the pellet surface and the resulting pellets adhere to each other to form aggregates is generated, that is, a problem of clumping. Particularly, in the case of a hindered amine compound having a low melting point (for example, a melting point of not higher than 65° C.), since it melts and bleeds out under high temperature of summertime or the like, there is a problem in terms of the storage stability (clumping resistance). Therefore, only about 50 parts by mass of such a hindered amine compound can be incorporated with respect to 100 parts by mass of polyolefin, presenting not much advantage in masterbatching.

Particularly, those hindered amine compounds obtained by reaction between 2,2,6,6-tetramethyl piperidinol and fatty acid exhibit excellent weather resistance-imparting effect; however, they are likely to be in a liquid form at a low molecular weight. Thus, when such a hindered amine compound is masterbatched with a resin for the purpose of improving the ease of handling, there is a problem that the additive is likely to bleed out to the surface of the resulting masterbatched resin composition to show adhesive property.

On the other hand, inorganic fillers such as talc do not have such problems of clumping and the like and can thus be incorporated at a high concentration. For example, Patent Document 1 discloses a masterbatch composition comprising talc at a high concentration of 80 to 40 parts by mass with respect to 20 to 60 parts by mass of a resin.

Further, as a method for improving the surface tackiness caused by bleeding of an additive component in a resin additive masterbatch, for example, Patent Document 2 proposes a method in which tackiness is suppressed by masterbatching with the use of an organic metal salt.

RELATED ART DOCUMENTS

Patent Documents

Patent Document 1: Japanese Unexamined Patent Application Publication No. 2003-165847
Patent Document 2: Japanese Unexamined Patent Application Publication No. 2008-189822

SUMMARY OF THE INVENTION

Problems to be Solved by the Invention

The invention disclosed in Patent Document 1 aims at improving the mechanical properties and achieving cost reduction, and there is no mention at all with regard to masterbatching with a low-melting-point additive. Further, in cases where a masterbatch is produced by blending a low-melting-point additive with a masterbatch containing a large amount of talc as in the invention disclosed in Patent Document 1, since the large amount of talc is added to the resulting resin molded article, the transparency of the resin molded article is consequently reduced and the use of the resin molded article is thus restricted. At present, the production of a masterbatch containing both a low-melting-point additive and talc at high concentrations has not been put into practice because the degree of freedom in the design of final resin composition product is poor. In other words, a masterbatch in which talc is incorporated at a high concentration is not suitable as an ordinary talc-free final product because talc affects the physical properties, such as transparency and elongation rate, of the final product.

Moreover, in Patent Document 2, the use of an organic metal salt in the masterbatch production enabled to suppress tackiness in the resultant; however, a further performance improvement is still desired at present.

In view of the above, an object of the present invention is to provide: a resin additive masterbatch in which a low-melting-point additive can be incorporated at a high concentration and which can be continuously produced without strand breakage, shows excellent clumping resistance to inhibit bleeding from a pellet thereof and thus has few use restrictions; and a polyolefin resin composition comprising the resin additive masterbatch.

Means for Solving the Problems

In order to solve the above-described problems, the present inventors intensively studied and discovered that the above-described problems can be solved by incorporating a prescribed amount of an inorganic layered compound into a masterbatch comprising a low-melting-point resin additive (melting point: not higher than 65° C.), thereby completing the present invention.

That is, the resin additive masterbatch of the present invention is characterized by comprising, with respect to 100 parts by mass of (A) a polyolefin resin: 50 to 200 parts by mass of (B) a resin additive having a melting point of not higher than 65° C.; and 10 to 20 parts by mass of (C) an inorganic layered compound.

In the resin additive masterbatch of the present invention, the above-described (B) resin additive having a melting point of not higher than 65° C. is preferably at least one hindered amine compound, more preferably at least one hindered amine compound represented by the following Formula (1):

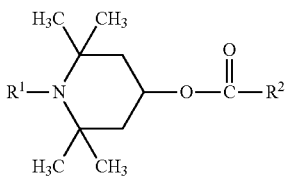

(wherein, $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 7 to 31 carbon atoms or an alkenyl group having 2 to 30 carbon atoms).

In the resin additive masterbatch of the present invention, it is also preferred that the (B) resin additive having a melting point of not higher than 65° C. be at least one benzoate compound represented by the following Formula (2):

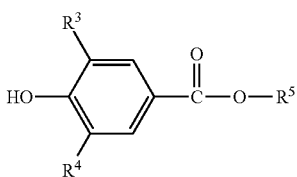

(wherein, $R^3$ and $R^4$ each independently represent a hydrogen atom, an alkyl group having 1 to 12 carbon atoms or an arylalkyl group having 7 to 30 carbon atoms; and $R^5$ represents an alkyl group having 8 to 30 carbon atoms).

Further, in the resin additive masterbatch of the present invention, it is preferred that the (B) resin additive having a melting point of not higher than 65° C. comprise at least one hindered amine compound represented by the Formula (1) and at least one benzoate compound represented by the Formula (2); and that the content ratio of the hindered amine compound(s) and the benzoate compound(s) be, in terms of mass ratio, in a range of 1:1 to 4:1.

Still further, in the resin additive masterbatch of the present invention, it is preferred that the (C) inorganic layered compound be talc.

It is preferred that the resin additive masterbatch of the present invention further comprise at least one aromatic metal phosphate represented by the following Formula (3) in an amount of 0.3 to 5 parts by mass:

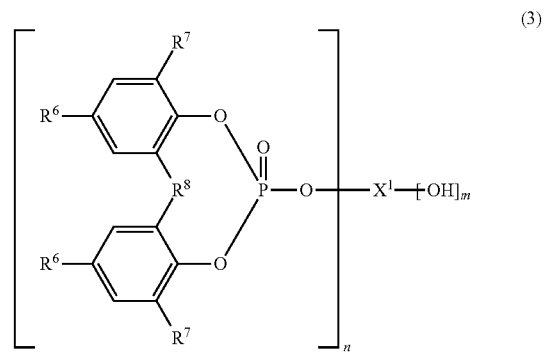

(wherein, $R^6$ represents a hydrogen atom or an alkyl group having 1 to 8 carbon atoms; $R^7$ represents an alkyl group having 4 to 8 carbon atoms; $R^8$ represents an alkylidene group having 1 to 4 carbon atoms; and $X^1$ represents an alkali metal atom, an alkaline earth metal atom or an aluminum atom, with provisos that: when $X^1$ is an alkali metal atom, n is 1 and m is 0; when $X^1$ is an alkaline earth metal atom, n is 2 and m is 0; and when $X^1$ is an aluminum atom, n is 1 or 2 and m is (3–n)).

It is also preferred that the resin additive masterbatch of the present invention further comprise at least one selected from the group consisting of benzotriazole-based ultraviolet absorbers represented by the following Formula (4) or (5) in an amount of 0.5 to 50 parts by mass:

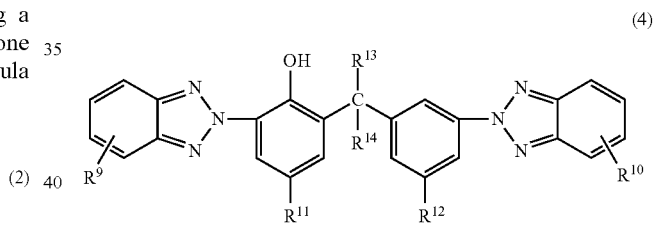

(wherein, $R^9$ and $R^{10}$ each independently represent a hydrogen atom, a chlorine atom or an alkyl group having 1 to 4 carbon atoms; $R^{11}$ and $R^{12}$ each independently represent a hydrogen atom or an alkyl group having 1 to 18 carbon atoms; and $R^{13}$ and $R^{14}$ each independently represent a hydrogen atom or an alkyl group having 1 to 4 carbon atoms); or

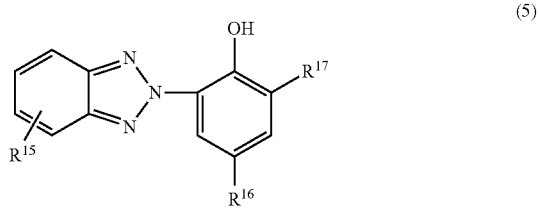

(wherein, $R^{15}$ represents a hydrogen atom, a chlorine atom or an alkyl group having 1 to 4 carbon atoms; and $R^{16}$ and $R^{17}$ each independently represent a hydrogen atom, an alkyl group having 1 to 18 carbon atoms or an aralkyl group having 7 to 18 carbon atoms).

The polyolefin resin composition of the present invention is characterized by comprising the above-described resin additive masterbatch in a polyolefin resin.

Effects of the Invention

According to the present invention, a resin additive masterbatch in which surface bleeding is inhibited without impairing the transparency despite a high concentration of a low-melting-point resin additive contained therein, which resin additive masterbatch not only shows excellent clumping resistance (storage stability) but also has fewer use restrictions than conventional ones, can be provided.

MODE FOR CARRYING OUT THE INVENTION

Preferred embodiments of the present invention will now be described in detail.

As the (A) polyolefin resin used in the present invention, any polyolefin can be employed without any particular restriction, and examples thereof include homopolymers or copolymers of α-olefin, such as polypropylenes, isotactic polypropylenes, syndiotactic polypropylenes, hemi-isotactic polypropylenes, stereoblock polypropylenes, cycloolefin polymers, polyethylenes, low-density polyethylenes, linear low-density polyethylenes, high-density polyethylenes, polybutene-1, poly-3-methylbutene, poly-3-methyl-1-pentene, poly-4-methyl-1-pentene and ethylene-propylene copolymers. A particularly preferred (A) polyolefin resin is, for example, polypropylene.

Examples of the (B) resin additive having a melting point of not higher than 65° C. that is used in the present invention include antioxidants, ultraviolet absorbers, light stabilizers, and mixtures thereof.

Examples of an antioxidant having a melting point of not higher than 65° C. include phosphorus-based antioxidants such as phenolic antioxidants and phosphite-based antioxidants; and sulfur-based antioxidants such as thioether-based antioxidants.

Examples of an ultraviolet absorber having a melting point of not higher than 65° C. include salicylic acid-based ultraviolet absorbers, benzophenone-based ultraviolet absorbers, benzotriazole-based ultraviolet absorbers and cyanoacrylate-based ultraviolet absorbers.

Examples of a light stabilizer having a melting point of not higher than 65° C. include hindered amine compounds.

More specifically, examples of a phenolic antioxidant having a melting point of not higher than 65° C. include stearyl(3,5-di-tert-butyl-4-hydroxyphenyl)propionate, thiobis(3-(3,5-di-tert-butyl-4-hydroxyphenyl)propionyloxy) ethyl, triethylene glycol-bis[(3-tert-butyl-4-hydroxy-5-methylphenyl)propionate], 2,4-bisoctylthio-6-(3,5-di-tert-butyl-4-hydroxyanilino)-s-triazine, 2-methyl-4,6-bis(octylthiomethyl)phenol, 2,4-dimethyl-6-(1-methylpentadecyl)phenol, esters of branched C7-9 mixed alcohol and (3,5-di-tert-butyl-4-hydroxyphenyl)propionic acid, and 2,2-thiobis(4-methyl-6-tert-butylphenol).

Examples of a phosphite-based antioxidant having a melting point of not higher than 65° C. include triphenyl phosphite, trisnonylphenyl phosphite, distearylpentaerythritol diphosphite, bisnonylphenylpentaerythritol diphosphite, phosphites of bisphenol A and C12-15 mixed alcohol, diphenyl-2-ethylhexyl phosphite, diphenylisodecyl phosphite, triisodecyl phosphite, phosphites of 1,1-butylidenebis(2-methyl-4-hydroxy-5-tert-butylphenyl) and tridecyl alcohol, and phosphites of 1,1,3-tris(2-methyl-4-hydroxy-5-tert-butylphenyl)butane and tridecyl alcohol.

Examples of a thioether-based antioxidant having a melting point of not higher than 65° C. include dilauryl thiodipropionate, ditridecyl thiodipropionate, distearyl thiodipropionate, pentaerythritol tetrakis(3-dodecylthiopropionate) and 4,4-thiobis(2-tert-butyl-5-methylphenol)bis-3-(dodecylthio)propionate.

Examples of an ultraviolet absorber having a melting point of not higher than 65° C. include phenyl salicylate, hexadecyl-3,5-di-tert-butyl-4-hydroxybenzoate, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, polymers of 4-(2-acryloyloxy)ethoxy-2-hydroxybenzophenone, 2-(2-hydroxy-4-octyloxyphenyl)-4,6-bis(2,4-dimethylphenyl)-1,3,5-triazine, 2-(4-isooctyloxyphenyl)-4,6-bis(2,4-dimethylphenyl)-1,3,5-triazine, 2-(2-hydroxy-4-(3-(2-ethylhexyl-1-oxy)-2-hydroxypropyloxy)phenyl)-4,6-bis(2,4-dimethylphenyl)-1,3,5-triazine, 2'-ethylhexyl-2-cyano-3-phenyl cinnamate and N-(2-ethoxyphenyl)-N'-(4-isododecylphenyl)oxamide.

Examples of a hindered amine compound having a melting point of not higher than 65° C. include fatty acid esters of 2,2,6,6-tetramethyl-4-piperidinol; mixtures of bis(1,2,2,6,6-pentamethyl-4-piperidyl)sebacate and methyl-1,2,2,6,6-pentamethyl-4-piperidyl sebacate; tetraesters of a mixed alcohol of 1,2,2,6,6-pentamethylpiperidinol and tridecyl alcohol and butanetetracarboxylic acid; tetraesters of a mixed alcohol of 2,2,6,6-tetramethylpiperidinol and tridecyl alcohol and butanetetracarboxylic acid; bis(1-octyloxy-2,2,6,6-pentamethyl-4-piperidyl)sebacate; polyesters of 1-(2-hydroxyethyl)-2,2,6,6-tetramethyl-4-piperidinol and butanedioic acid; reaction products between 2,2,6,6-tetramethyl-4-(2-propenyloxy)piperidine and methyl hydrogen siloxane; mixtures of dodecyl-3-(2,2,4,4-tetramethyl-21-oxo-7-oxa-3,20-diazadispiro(5.1.11.2)heneicosan-20-yl) propionate and tetradecyl-3-(2,2,4,4-tetramethyl-21-oxo-7-oxa-3,20-diazadispiro(5.1.11.2)heneicosan-20-yl) propionate; mixtures of dodecyl-N-(2,2,6,6-tetramethylpiperidin-4-yl)-b-alaninate and tetradecyl-N-(2,2,6,6-tetramethylpiperidin-4-yl)-b-alaninate; 3-dodecyl-N-(2,2,6,6-tetramethylpiperidin-4-yl)succinimide; and 2-dodecyl-N-(1-acetyl-2,2,6,6-tetramethylpiperidin-4-yl).

The (B) resin additive having a melting point of not higher than 65° C. also encompasses those resin additives that have a melting point of not higher than 65° C. and are liquids at normal temperature.

The (B) resin additive having a melting point of not higher than 65° C. is preferably a hindered amine compound, more preferably a hindered amine compound represented by the following Formula (1):

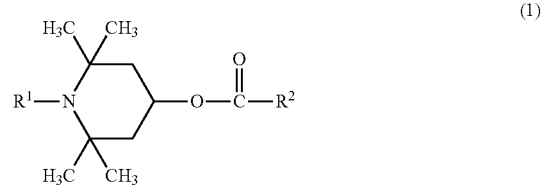

(1)

(wherein, $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 7 to 31 carbon atoms or an alkenyl group having 2 to 30 carbon atoms).

Examples of the alkyl group having 1 to 30 carbon atoms that may be represented by $R^1$ in the Formula (1) include methyl, ethyl, propyl, isopropyl, butyl, isobutyl, sec-butyl, tert-butyl, pentyl, sec-pentyl, tert-pentyl, hexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl and octadecyl. Examples of the alkyl group having 7 to 31 carbon atoms that may be represented by $R^2$ include heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl and octadecyl. Particularly, when $R^1$ or $R^2$ is a mixture of alkyl groups having different numbers of carbon atoms, the (B) resin additive is likely to have a low melting point; therefore, in the present invention, such a mixture is also preferably used.

Examples of the hydroxyalkyl group having 1 to 30 carbon atoms that may be represented by $R^1$ in the Formula (1) include the above-described alkyl groups substituted with a hydroxy group, such as hydroxyethyl, 2-hydroxypropyl and 3-hydroxypropyl.

Examples of the alkoxy group having 1 to 30 carbon atoms that may be represented by $R^1$ in the Formula (1) include those alkoxy groups corresponding to the above-described alkyl groups, such as methoxy, ethoxy, propoxy, isopropoxy, butoxy, octoxy and 2-ethylhexyloxy.

Examples of the hydroxyalkoxy group having 1 to 30 carbon atoms that may be represented by $R^1$ in the Formula (1) include those hydroxyalkoxy groups that correspond to the above-described alkoxy groups, such as hydroxyethyloxy, 2-hydroxypropyloxy, 3-hydroxypropyloxy, 4-hydroxybutyloxy, 2-hydroxy-2-methylpropyloxy and 6-hydroxyhexyloxy.

Examples of the alkenyl group having 2 to 30 carbon atoms that may be represented by $R^2$ in the Formula (1) include vinyl, propenyl, butenyl, hexenyl and oleyl. The double bond thereof may be located internally or at the α- or ω-position.

More specific examples of the compound represented by the Formula (1) include the following Compound Nos. 1 to 6. It is noted here, however, that the present invention is not restricted thereto by any means.

Compound No. 1

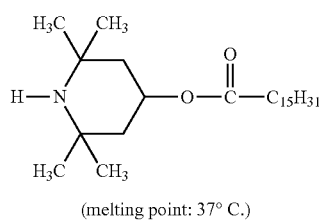

(melting point: 37° C.)

Compound No. 2

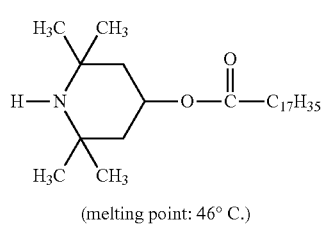

(melting point: 46° C.)

Compound No. 3

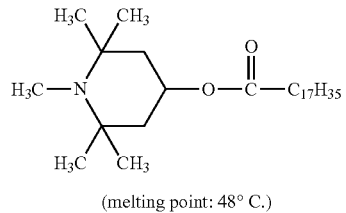

(melting point: 48° C.)

Compound No. 4

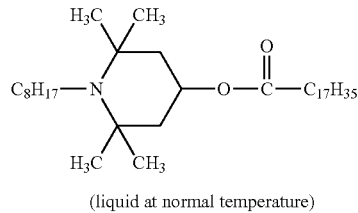

(liquid at normal temperature)

Compound No. 5

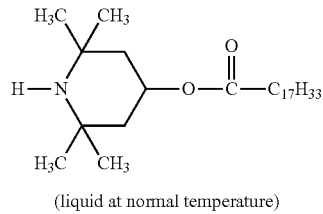

(liquid at normal temperature)

Compound No. 6

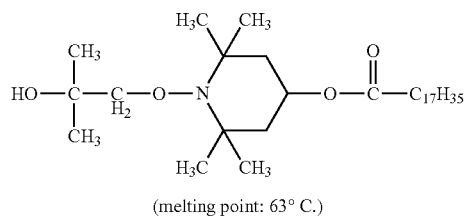

(melting point: 63° C.)

Among these compounds represented by the Formula (1), compounds other than the Compound No. 6 have a melting point of 60° C. or lower and are thus particularly preferred.

The method of synthesizing these compounds represented by the Formula (1) is not particularly restricted, and they can be synthesized by a method that is used in ordinary organic synthesis. For example, esterification can be performed by direct esterification between an acid and an alcohol, reaction between an acid halide and an alcohol, transesterification reaction or the like. As a purification method, for example, distillation, recrystallization, reprecipitation, or a method using a filtration agent and/or an absorbent can be employed as appropriate.

Further, the (B) resin additive having a melting point of not higher than 65° C. is preferably a benzoate compound, more preferably a compound represented by the following Formula (2):

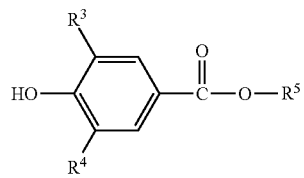

(2)

(wherein, $R^3$ and $R^4$ each independently represent a hydrogen atom, an alkyl group having 1 to 12 carbon atoms or an arylalkyl group having 7 to 30 carbon atoms; and $R^5$ represents an alkyl group having 8 to 30 carbon atoms).

Examples of the alkyl group having 1 to 12 carbon atoms that may be represented by $R^3$ and $R^4$ in the Formula (2) include methyl, ethyl, propyl, isopropyl, butyl, sec-butyl, tert-butyl, pentyl, hexyl, octyl and cycloalkyl groups such as cyclopentyl and cyclohexyl, and examples of the arylalkyl group having 7 to 30 carbon atoms include benzyl, phenylethyl and 1-methyl-1-phenylethyl.

Examples of the alkyl group having 8 to 30 carbon atoms that may be represented by $R^5$ include octyl, nonyl, decyl, undecyl, dodecyl, tridecyl, tetradecyl, pentadecyl, hexadecyl and octadecyl. When $R^5$ is a single alkyl group, a large number of carbon atoms leads to an increase in the melting point; however, since a mixture of alkyl groups lowers the melting point, even a compound in which $R^5$ is such a mixture of alkyl groups that do not each correspond to the above-described ones can also be used in the present invention.

More specific examples of the compound represented by the Formula (2) include the following Compound Nos. 7 and 8. It is noted here, however, that the present invention is not restricted thereto by any means.

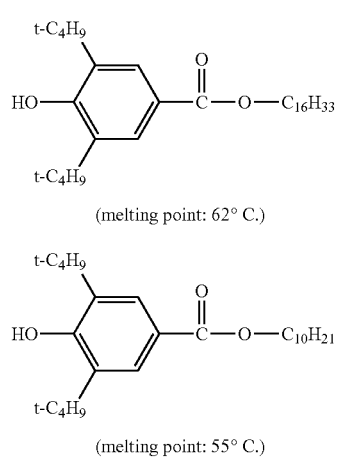

Compound No. 7

(melting point: 62° C.)

Compound No. 8

(melting point: 55° C.)

The method of synthesizing these compounds represented by the Formula (2) is not particularly restricted, and they can be synthesized by a method that is used in ordinary organic synthesis. For example, esterification can be performed by direct esterification between an acid and an alcohol, reaction between an acid halide and an alcohol, transesterification reaction or the like. As a purification method, for example, distillation, recrystallization, reprecipitation, or a method using a filtration agent and/or an absorbent can be employed as appropriate.

It is also preferred that the (B) resin additive having a melting point of not higher than 65° C. contain at least one of the above-described hindered amine compounds represented by the Formula (1) and at least one of the above-described benzoate compounds represented by the Formula (2). In this case, it is preferred that the content ratio of the hindered amine compound(s) and the benzoate compound(s) be 1:1 to 4:1 in terms of mass ratio.

In the resin additive masterbatch of the present invention, the (B) resin additive having a melting point of not higher than 65° C. is contained in an amount of 50 to 200 parts by mass, preferably 70 to 150 parts by mass, with respect to 100 parts by mass of the (A) polyolefin resin. When the amount of the (B) resin additive having a melting point of not higher than 65° C. is less than 50 parts by mass, the masterbatch is required to be added in a large amount and thus does not have much advantage as a high-concentration masterbatch. Meanwhile, when the amount of the (B) resin additive having a melting point of not higher than 65° C. is greater than 200 parts by mass, the additive is likely to bleed out and the resulting pellets adhere with each other, which leads to a reduction in the clumping resistance.

The (C) inorganic layered compound used in the present invention may be either a natural or synthetic product and can be used regardless of the presence or absence of surface treatment and crystal water. Examples thereof include talc, mica, kaolin, hydrotalcite and various clays. These (C) inorganic layered compounds may be used individually, or two or more thereof maybe used in combination.

In the resin additive masterbatch of the present invention, the (C) inorganic layered compound is contained in an amount of 10 to 20 parts by mass with respect to 100 parts by mass of the (A) polyolefin resin. When the amount of the (C) inorganic layered compound is less than 10 parts by mass, the clumping resistance is reduced, whereas when the amount is greater than 20 parts by mass, the transparency and the like are deteriorated, so that the use of the masterbatch may be restricted.

In the resin additive masterbatch of the present invention, in order to further improve the clumping resistance (storage stability), one or more aromatic metal phosphates represented by the following Formula (3) can be used.

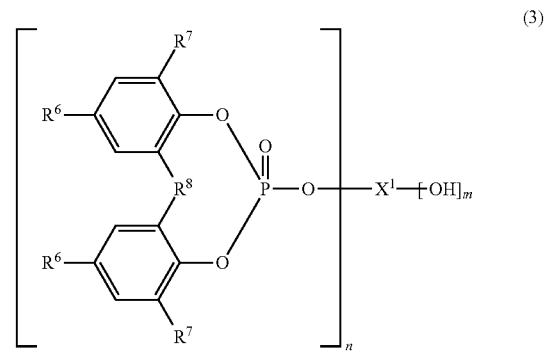

(3)

(wherein, $R^6$ represents a hydrogen atom or an alkyl group having 1 to 8 carbon atoms; $R^7$ represents an alkyl group having 4 to 8 carbon atoms; $R^8$ represents an alkylidene group having 1 to 4 carbon atoms; and $X^1$ represents an alkali metal atom, an alkaline earth metal atom or an aluminum atom, with provisos that: when $X^1$ is an alkali metal atom, n is 1 and m is 0; when $X^1$ is an alkaline earth metal atom, n is 2 and m is 0; and when $X^1$ is an aluminum atom, n is 1 or 2 and m is (3−n)).

Examples of the alkyl group having 1 to 8 carbon atoms that is represented by $R^6$ in the Formula (3) include methyl, ethyl, propyl, isopropyl, butyl, sec-butyl, tert-butyl, pentyl, tert-pentyl, hexyl, cyclohexyl, heptyl, octyl, isooctyl and tert-octyl.

Examples of the alkyl group having 4 to 8 carbon atoms that is represented by $R^7$ include butyl, sec-butyl, tert-butyl, pentyl, tert-pentyl, hexyl, cyclohexyl, heptyl, octyl, isooctyl and tert-octyl.

Examples of the alkylidene group having 1 to 4 carbon atoms that is represented by $R^8$ include methylene, ethylidene, 1,1-propylidene, 2,2-propylidene and butylidene.

Examples of the metal represented by $X^1$ include alkali metals such as lithium, sodium and potassium; alkaline earth metals such as magnesium and calcium; and aluminum. Thereamong, alkali metals are preferred.

More specific examples of the compound represented by the Formula (3) include the following Compound Nos. 9 to 26. It is noted here, however, that the present invention is not restricted thereto by any means.

Compound No. 9
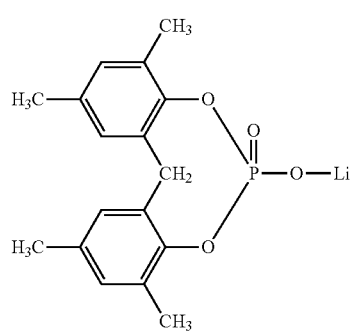

Compound No. 10
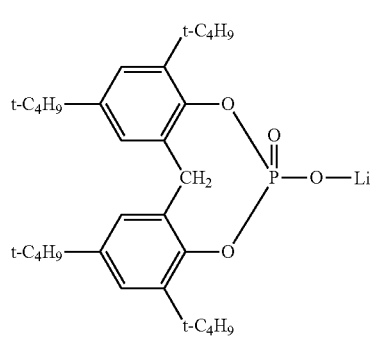

Compound No. 11
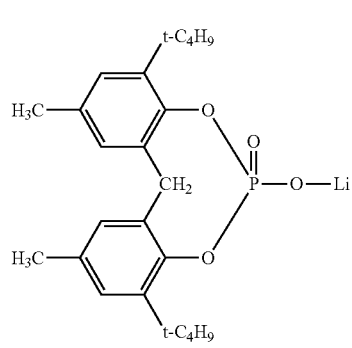

Compound No. 12
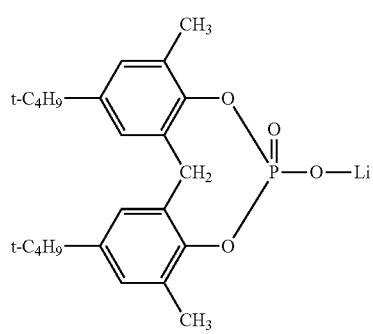

-continued

Compound No. 13
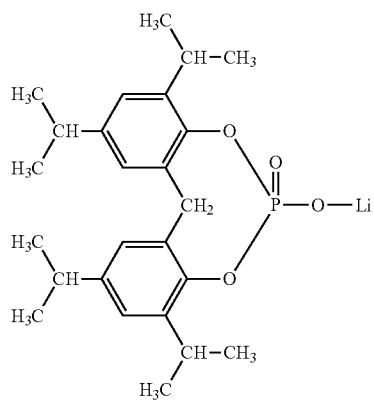

Compound No. 14
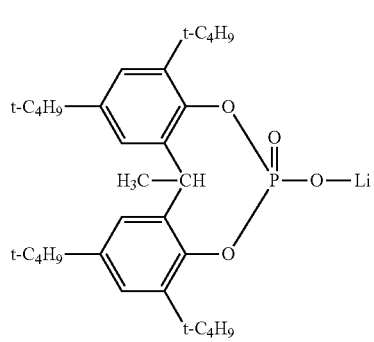

Compound No. 15
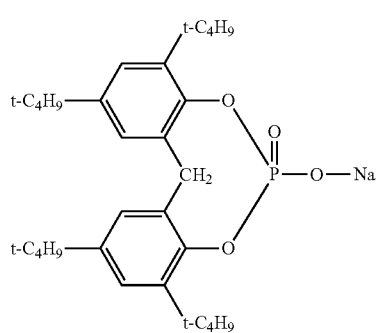

Compound No. 16
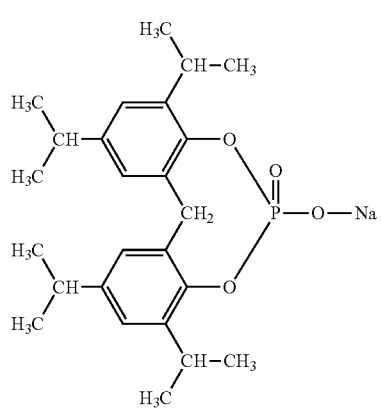

Compound No. 17
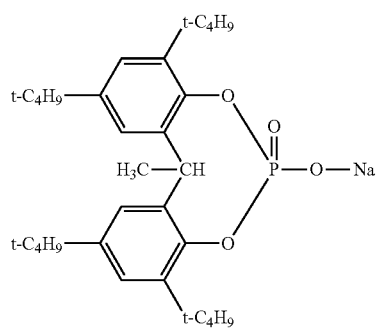
Compound No. 18
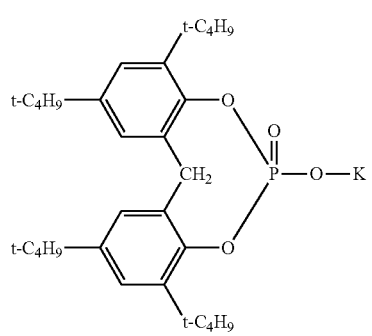
Compound No. 19
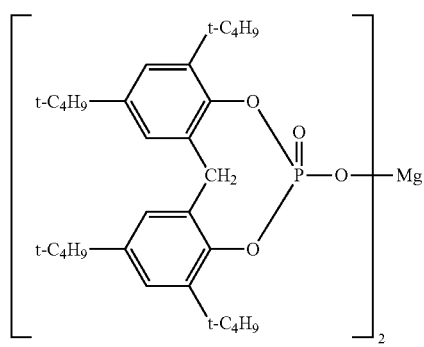
Compound No. 20
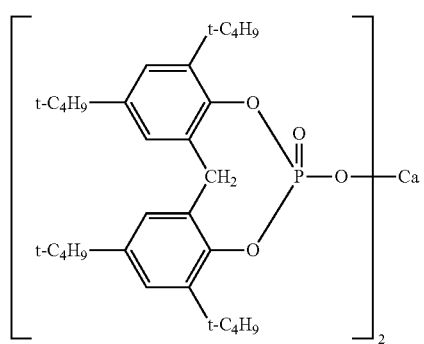
Compound No. 21
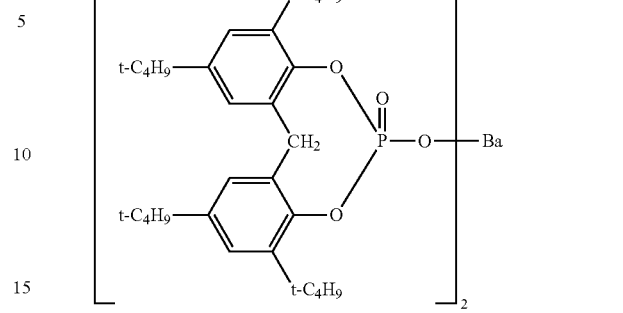
Compound No. 22
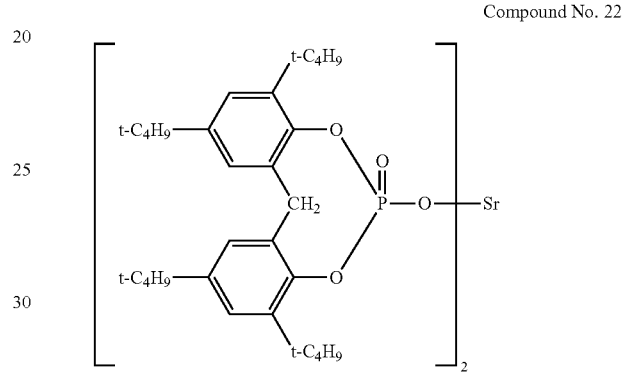
Compound No. 23
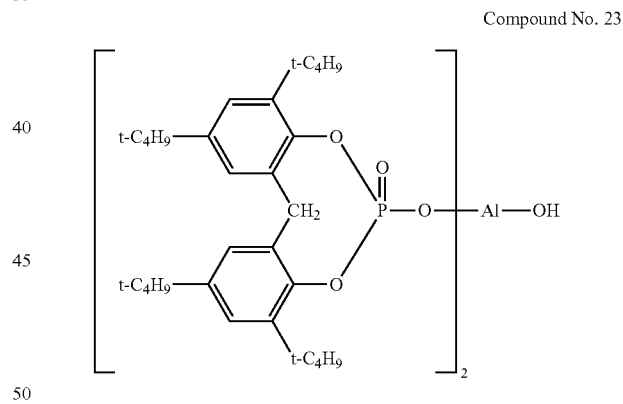
Compound No. 24
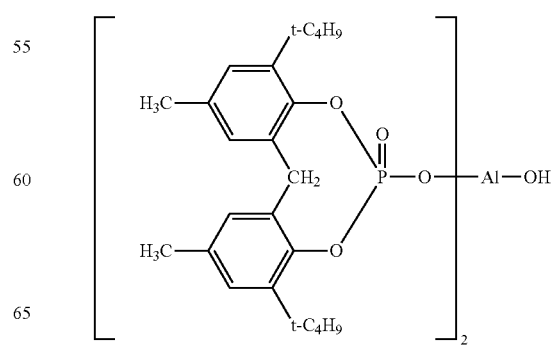

-continued

Compound No. 25

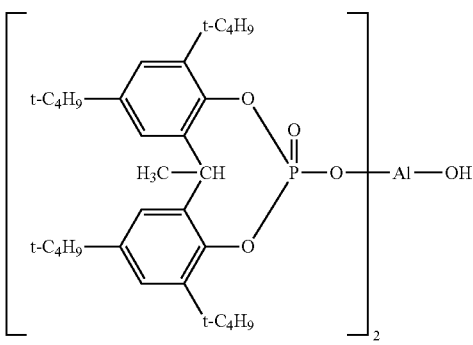

Compound No. 26

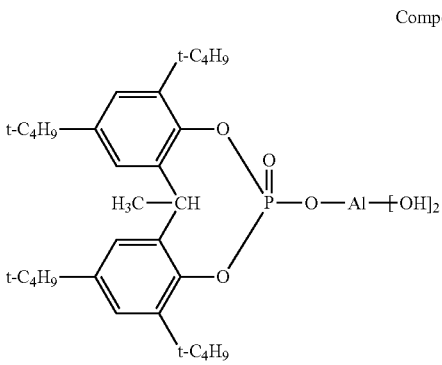

In cases where an aromatic metal phosphate represented by the Formula (3) is incorporated, the amount thereof is preferably 0.3 to 5 parts by mass with respect to 100 parts by mass of the (A) polyolefin resin. When the amount of the aromatic metal phosphate is less than 0.3 parts by mass, the effect thereof may not be sufficiently exerted, whereas when the amount is greater than 5 parts by mass, the aromatic metal phosphate affects the crystallinity and the like of a resin to which the masterbatch is added and the physical properties of the resin are impaired.

Further, in the resin additive masterbatch of the present invention, one or more benzotriazole-based ultraviolet absorber can also be used. Examples of the benzotriazole-based ultraviolet absorber used in the present invention include 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis[4-(1,1,3,3-tetramethylbutyl)-6-benzotriazole-2-yl-phenol], polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl] benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole and 2-[2-hydroxy-4-(3-methacryloyloxypropyl)phenyl]benzotriazole.

As the benzotriazole-based ultraviolet absorber, from the standpoint of the clumping resistance (storage stability) of the resulting pellet, it is preferred to use at least one selected from the group consisting of compounds represented by the following Formula (4) or (5):

(4)

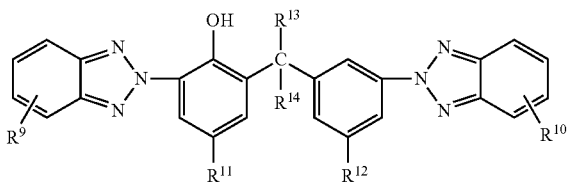

(wherein, $R^9$ and $R^{10}$ each independently represent a hydrogen atom, a chlorine atom or an alkyl group having 1 to 4 carbon atoms; $R^{11}$ and $R^{12}$ each independently represent a hydrogen atom or an alkyl group having 1 to 18 carbon atoms; and $R^{13}$ and $R^{14}$ each independently represent a hydrogen atom or an alkyl group having 1 to 4 carbon atoms); or (5)

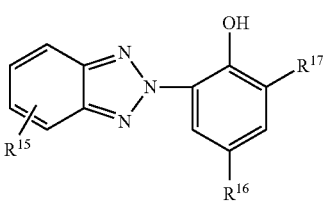

(wherein, $R^{15}$ represents a hydrogen atom, a chlorine atom or an alkyl group having 1 to 4 carbon atoms; and $R^{16}$ and $R^{17}$ each independently represent a hydrogen atom, an alkyl group having 1 to 18 carbon atoms or an aralkyl group having 7 to 18 carbon atoms).

Examples of the alkyl group having 1 to 4 carbon atoms that is represented by $R^9$, $R^{10}$, $R^{13}$ and $R^{14}$ in the Formula (4) include methyl, ethyl, propyl, isopropyl, butyl, sec-butyl and tert-butyl.

Further, examples of the alkyl group having 1 to 18 carbon atoms that is represented by $R^{11}$ and $R^{12}$ include methyl, ethyl, propyl, isopropyl, butyl, sec-butyl, tert-butyl, pentyl, sec-pentyl, tert-pentyl, hexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl and octadecyl.

More specific examples of the compound represented by the Formula (4) include the following Compound Nos. 27 to 31. It is noted here, however, that the present invention is not restricted thereto by any means.

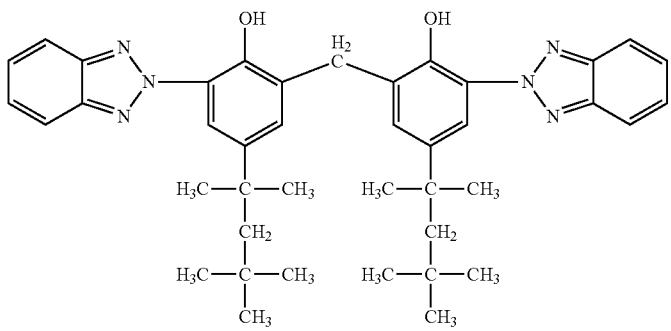

Compound No. 27

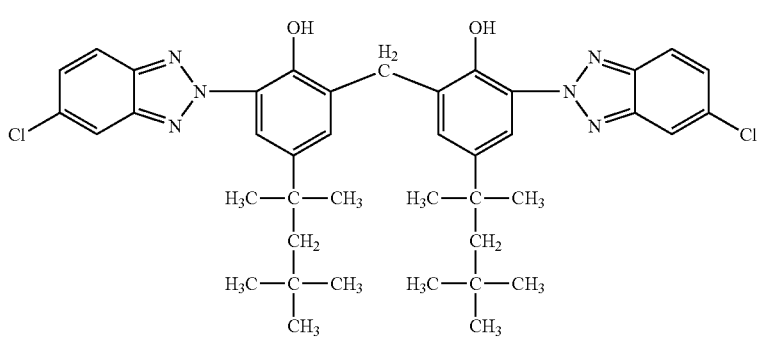

Compound No. 28

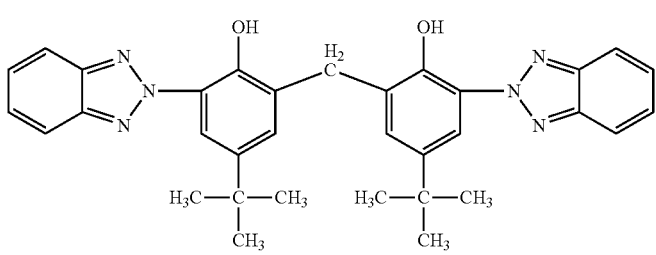

Compound No. 29

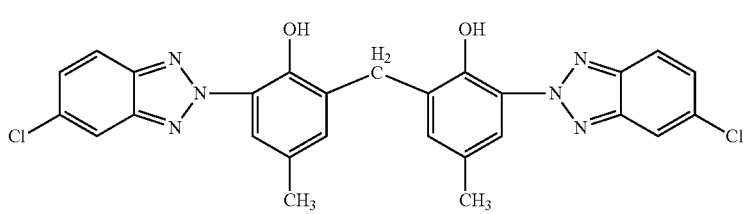

Compound No. 30

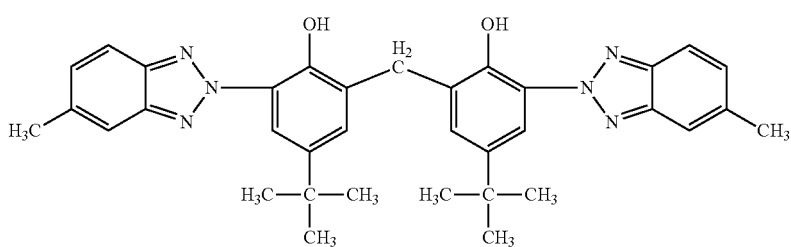

Compound No. 31

Among these compounds represented by the Formula (4), from the standpoint of the clumping resistance (storage stability) of the masterbatch, Compound No. 27 is particularly preferred.

In the Formula (5), examples of the alkyl group having 1 to 4 carbon atoms that may be represented by $R^{15}$ and examples of the alkyl group having 1 to 18 carbon atoms that may be represented by $R^{16}$ and $R^{17}$ are the same ones as those described above. The aralkyl group having 7 to 18 carbon atoms that may be represented by $R^{16}$ and $R^{17}$ is one of the above-described alkyl groups whose hydrogen atom(s) is/are substituted with an aryl group such as a phenyl group, and examples thereof include an α,α-dimethylbenzyl group.

Examples of the compound represented by the Formula (5) include 2-(2'-hydroxy-5'-methylphenyl)benzotriazole, 2,4-bis(α,α-dimethylbenzyl)-6-(2H-benzotriazole-2-yl)phenol, 2-(5-chloro-2H-benzotriazole-2-yl)-4-methyl-6-tert-butylphenol, 4,6-bis(1,1-dimethylpropyl)-2-(2H-benzotriazole-2-yl)phenol and 2-(2-hydroxy-5-tert-octylphenyl)-2H-benzotriazole.

Among these compounds represented by the Formula (5), from the standpoint of the clumping resistance (storage stability) of the masterbatch, 2-(2'-hydroxy-5'-methylphenyl)benzotriazole is preferred.

The above-described benzotriazole-based ultraviolet absorber is incorporated in an amount of 0.5 to 50 parts by mass, preferably 1.0 to 25 parts by mass, with respect to 100 parts by mass of the (A) polyolefin resin. When the amount of the benzotriazole-based ultraviolet absorber is less than 0.5 parts by mass, adhesion of the resulting pellets occurs and the clumping resistance is consequently reduced, whereas when the amount is greater than 50 parts by mass, the melt viscosity is reduced, which may make pelletization difficult.

The method of producing the resin additive masterbatch of the present invention is not particularly restricted, and the resin additive masterbatch of the present invention can be produced by a conventionally-known method. For example, after dry-blending the components to be incorporated, the resultant may be mixed using a Henschel mixer, a mill roll, a Banbury mixer, a super mixer or the like, kneaded using an uniaxial or biaxial extruder or the like, and then pelletized.

A resin to be stabilized by the resin additive masterbatch of the present invention may be of any type, such as a thermoplastic resin, a thermosetting resin, a crystalline resin, an amorphous resin, a biodegradable resin, a non-biodegradable resin, a synthetic resin, a naturally-occurring resin, a general-purpose resin, an engineering resin or a polymer alloy.

The synthetic resin may be, for example, a thermoplastic resin such as an α-olefin homopolymer (e.g., polypropylene, low-density polyethylene, linear low-density polyethylene, high-density polyethylene, polybutene-1, poly-3-methylpentene, poly-4-methylpentene) or copolymer (e.g., an ethylene-propylene copolymer), a polyunsaturated compound of these α-olefins and conjugated diene, unconjugated diene or the like, a cycloolefin polymer, a copolymer with acrylic acid, methacrylic acid, vinyl acetate or the like, a linear polyester or acid-modified polyester (e.g., polyethylene terephthalate, polyethylene terephthalate-isophthalate, polyethylene terephthalate-paraoxybenzoate, or polybutylene terephthalate), a biodegradable resin represented by polylactic acid (e.g., aliphatic polyester), a liquid-crystal polyester, a polyamide (e.g., polycaprolactam or polyhexamethylene adipamide), a liquid-crystal polyamide, a polyimide, a polystyrene, a copolymer (e.g., acrylonitrile-styrene copolymer (AS) resin, acrylonitrile-butadiene-styrene copolymer (ABS) resin, methyl methacrylate-butadiene-styrene copolymer (MBS) resin or heat-resistant ABS resin) composed of styrene and/or α-methylstyrene with other monomer (e.g., maleic anhydride, phenyl maleimide, methyl methacrylate, butadiene or acrylonitrile), a halogen-containing resin (e.g., polyvinyl chloride, polyvinylidene chloride, chlorinated polyethylene, chlorinated polypropylene, polyvinylidene fluoride, chlorinated rubber, vinyl chloride-vinyl acetate copolymer, vinyl chloride-ethylene copolymer, vinyl chloride-vinylidene chloride copolymer, vinyl chloride-vinylidene chloride-vinyl acetate ternary copolymer, vinyl chloride-acrylate copolymer, vinyl chloride-maleate copolymer or vinyl chloride-cyclohexylmaleimide copolymer), a (meth)acrylate polymer (e.g., methyl (meth)acrylate, ethyl (meth)acrylate or octyl (meth)acrylate), a polyether ketone, a polyvinyl acetate, a polyvinyl formal, a polyvinyl butyral, a polyvinyl alcohol, a linear or branched polycarbonate, a petroleum resin, a coumarone resin, a polyphenylene oxide, a polyphenylene sulfide, a thermoplastic polyurethane or a cellulose-based resin; a thermosetting resin such as an epoxy resin, a phenol resin, a urea resin, a melamine resin, an unsaturated polyester resin or a thermosetting polyurethane; an elastomer (e.g., an isoprene rubber, a butadiene rubber, a butadiene-styrene copolymer rubber, a butadiene-acrylonitrile copolymer rubber, an acrylonitrile-butadiene-styrene copolymer rubber, a copolymer rubber of ethylene and α-olefin such as propylene or butene-1, or a ternary copolymer rubber of ethylene-α olefin and a non-conjugated dienes such as ethylidene norbornene or cyclopentadiene); or a silicon resin. The synthetic resin may also be an alloy or blend of any of these resins and/or an elastomer. Thereamong, a polyolefin resin is preferred.

Examples of the naturally-occurring resin include natural rubbers, microorganism-produced aliphatic polyesters such as 3-hydroxybutyrate, microorganism-produced aliphatic polyamides, starch, cellulose, chitin/chitosan, and gluten/gelatin.

The expression of the stabilization effect of the above-described resins may be variable depending on, for example, the stereoregularity, the specific gravity, the type of polymerization catalyst, the presence/absence and degree of removal of the polymerization catalyst, the degree of crystallization, the polymerization conditions such as temperature and pressure, the crystal type, the size of lamella crystal determined by X-ray small-angle scattering, the aspect ratio of the crystal, the solubility in an aromatic or aliphatic solvent, the solution viscosity, the melt viscosity, the average molecular weight, the degree of molecular weight distribution, the number of peaks in the molecular weight distribution, whether the copolymer thereof is a block or random copolymer, and the blending ratio of each monomer; however, the resin additive masterbatch of the present invention can be applied to any of the above-described resins.

The method of blending the resin additive masterbatch of the present invention into a resin is not particularly restricted, and any known technology for blending a stabilizer into a resin can be employed. For example, a method in which a masterbatch is mixed with resin powder or pellet using a Henschel mixer or the like and the resulting mixture is then kneaded using an extruder or the like can be employed. The types of the processing machines, the processing temperatures, the post-processing cooling conditions and the like are also not particularly restricted, and it is preferred to select such conditions that allow the resulting resin to have physical properties suitable for its intended use.

The mass ratio at which the resin additive masterbatch of the present invention is blended into a resin is dependent on, for example, the concentration of the resin additive in the masterbatch and the final concentration of the resin additive in the resin composition in which the masterbatch is incorporated; however, the resin additive masterbatch is blended in an amount of preferably 0.01 to 20 parts by mass, more preferably 0.05 to 10 parts by mass, with respect to 100 parts by mass of the resin.

In cases where the resin additive masterbatch of the present invention is used for stabilization of a resin, a variety of formulation agents that are generally used in various resins are used as required. These formulation agents may each be the same as or different from the above-described (B) resin additive having a melting point of not higher than 65° C., (C) inorganic layered compound, aromatic metal phosphate and benzotriazole-based ultraviolet absorber that are used in the resin additive masterbatch of the present invention.

Examples of such formulation agents include phenolic antioxidants, sulfur-based antioxidants, phosphorus-based antioxidants, ultraviolet absorbers, hindered amine compounds, nucleating agents, flame retardants, flame retardant aids, lubricants, fillers, fibrous fillers, metallic soaps, hydrotalcites, antistatic agents, pigments and dyes. These formulation agents may be blended together with the resin additive masterbatch of the present invention, or they may be blended separately. Alternatively, as long as the storage stability of the resin additive masterbatch of the present invention is not affected, the formulation agents may be incorporated into the masterbatch to be blended.

Examples of the phenolic antioxidants include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene-bis[(3,5-di-tert-butyl-4-hydroxyphenyl) propionic acid amide], 4,4'-thiobis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, thiodiethylene glycol-bis[(3,5-di-tert-butyl-4-hydroxyphenyl)propionate], 1,6-hexamethylene-bis[(3,5-di-tert-butyl-4-hydroxyphenyl) propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5.5]undecane and triethylene glycol-bis[(3-tert-butyl-4-hydroxy-5-methylphenyl)propionate]. When a phenolic antioxidant is blended together with the masterbatch, the amount the phenolic antioxidant is preferably 0.5 to 50 parts by mass, more preferably 1 to 30 parts by mass, with respect to 100 parts by mass of the resin. When a phenolic antioxidant is blended into a final resin composition separately from the masterbatch, the amount of the phenolic antioxidant is preferably 0.001 to 10 parts by mass, more preferably 0.01 to 5 parts by mass, with respect to 100 parts by mass of the resin contained in the final product.

Examples of the sulfur-based antioxidants include dialkyl thiodipropionates such as dilauryl thiodipropionate, dimyristyl thiodipropionate and distearyl thiodipropionate; and β-alkylthiopropionates of polyols such as pentaerythritol tetrakis(β-dodecylthiopropionate). When a sulfur-based antioxidant is blended together with the masterbatch, the amount the sulfur-based antioxidant is preferably 0.5 to 50 parts by mass, more preferably 1 to 30 parts by mass, with respect to 100 parts by mass of the resin. When a sulfur-based antioxidant is blended into a final resin composition separately from the masterbatch, the amount of the sulfur-based antioxidant is preferably 0.001 to 10 parts by mass, more preferably 0.01 to 5 parts by mass, with respect to 100 parts by mass of the resin contained in the final product.

Examples of the phosphorus-based antioxidants include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl) biphenylene diphosphonite, 9,10-dihydro-9-oxa-10-phosphaphenanthrene-10-oxide, 2,2'-methylene-bis(4,6-di-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, and phosphites of 2-ethyl-2-butylpropylene glycol and 2,4,6-tri-tert-butylphenol. When a phosphorus-based antioxidant is blended together with the masterbatch, the amount the phosphorus-based antioxidant is preferably 0.5 to 50 parts by mass, more preferably 1 to 30 parts by mass, with respect to 100 parts by mass of the resin. When a phosphorus-based antioxidant is blended into a final resin composition separately from the masterbatch, the amount of the phosphorus-based antioxidant is preferably 0.001 to 10 parts by mass, more preferably 0.01 to 5 parts by mass, with respect to 100 parts by mass of the resin contained in the final product.

Examples of the ultraviolet absorbers include 2-hydroxybenzophenones such as 2,4-dihydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2'-hydroxyphenyl)benzotriazoles such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and triaryl triazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine. When an ultraviolet absorber is blended together with the masterbatch, the amount the ultraviolet absorber is preferably 0.5 to 50 parts by mass, more preferably 1 to 30 parts by mass, with respect to 100 parts by mass of the resin. When an ultraviolet absorber is blended into a final resin composition separately from the masterbatch, the amount of the ultraviolet absorber is preferably 0.001 to 10 parts by mass, more preferably 0.01 to 5 parts by mass, with respect to 100 parts by mass of the resin contained in the final product.

Examples of the hindered amine compounds include 2,2,6,6-tetramethyl-4-piperidyl stearate, 1,2,2,6,6-pentamethyl-4-piperidyl stearate, 2,2,6,6-tetramethyl-4-piperidylbenzoate, bis(2,2,6,6-tetramethyl-4-piperidyl)sebacate, bis (1,2,2,6,6-pentamethyl-4-piperidyl)sebacate, tetrakis(2,2,6,6-tetramethyl-4-piperidyl)butane tetracarboxylate, tetrakis (1,2,2,6,6-pentamethyl-4-piperidyl)butane tetracarboxylate, bis(2,2,6,6-tetramethyl-4-piperidyl).di(tridecyl)-1,2,3,4-butane tetracarboxylate, bis(1,2,2,6,6-pentamethyl-4-piperidyl).di(tridecyl)-1,2,3,4-butane tetracarboxylate, bis(1,2,2,6,6-pentamethyl-4-piperidyl)-2-butyl-2-(3,5-di-tert-butyl-4- hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1, 5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylaminoundecane and 1,6,11-tris[2,4-bis(N-butyl-N-(1,2,2,6,6-pentamethyl-4-piperidyl)amino)-s-triazine-6-ylaminoundecane. When a hindered amine compound is blended together with the masterbatch, the amount the hindered amine compound is preferably 0.5 to 50 parts by mass, more preferably 1 to 30 parts by mass, with respect to 100 parts by mass of the resin. When a hindered amine compound is blended into a final resin composition separately from the masterbatch, the amount of the hindered amine compound is preferably 0.001 to 10 parts by mass, more preferably 0.01 to 5 parts by mass, with respect to 100 parts by mass of the resin contained in the final product.

Examples of the nucleating agents include metal salts of aromatic carboxylic acids, such as aluminum p-t-butyl benzoate and sodium benzoate; metal salts of alicyclic carboxylic acids, such as disodium-bicyclo(2,2,1)heptane-2,3-dicarboxylate; acidic metal phosphates such as sodium-bis(2,4-di-tert-butylphenyl)phosphate, lithium-bis(2,4-di-tert-butylphenyl)phosphate and sodium-2,2'-methylene-bis(4,6-di-tert-butylphenyl)phosphate; and polyhydric alcohol derivatives such as dibenzylidene sorbitol, bis(methylbenzylidene)sorbitol and bis(3,4-dimethylbenzylidene)sorbitol.

Examples of the flame retardants include halogen-based flame retardants; phosphorus-based flame retardants such as red phosphorus, ammonium polyphosphate, melamine phosphate, melamine pyrophosphate, melamine polyphosphate, piperazine phosphate, piperazine pyrophosphate, piperazine polyphosphate, guanidine phosphate, triphenyl phosphate, dihydric phenols (e.g., hydroquinone, resorcinol, bisphenol A and 4,4'-dihydroxybiphenyl), phosphate compounds (e.g., phenol phosphate), phosphazene compounds, and phosphinates; nitrogen-based flame retardants such as melamine cyanurate; and metal hydroxides such as magnesium hydroxide and aluminum hydroxide. Examples of the flame retardant aids include inorganic compounds such as antimony trioxide and zinc borate; and anti-dripping agents such as polytetrafluoroethylenes.

Examples of the lubricants include fatty acid amides such as lauryl amide, myristyl amide, stearyl amide and behenyl amide; ethylene-bis stearyl amide; polyethylene wax; metallic soaps such as calcium stearate and magnesium stearate; and metal phosphates such as magnesium distearyl phosphate and magnesium stearyl phosphate.

As the filler, an inorganic substance such as talc, silica, calcium carbonate, glass fiber, potassium titanate or potassium borate is employed by appropriately selecting the particle size in the case of a spherical filler, or the fiber diameter, fiber length and aspect ratio in the case of a fibrous filler. Further, the filler to be used is preferably subjected to a surface treatment as required.

Examples of the metallic soaps include barium laurate and zinc octoate.

The above-described hydrotalcites may each be either a natural or synthetic product and can be used regardless of the presence or absence of surface treatment and crystal water. Examples of such hydrotalcites include basic carbonates represented by the following Formula (6):

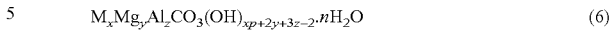

$$M_xMg_yAl_zCO_3(OH)_{xp+2y+3z-2} \cdot nH_2O \qquad (6)$$

(wherein, M represents an alkali metal or zinc; x represents a number of 0 to 6; y represents a number of 0 to 6; z represents a number of 0.1 to 4; p represents the valence of M; and n represents the number of crystal water in a range of 0 to 100). Further, some of anions may be substituted with a perchlorate anion or the like.

Examples of the antistatic agents include cationic antistatic agents such as fatty acid quaternary ammonium ion salts and polyamine quaternary salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates and higher alcohol ethylene oxide adduct phosphates; nonionic antistatic agents such as polyhydric alcohol fatty acid esters, polyglycol phosphates and polyoxyethylene alkyl allyl ethers; and amphoteric antistatic agents such as amphoteric alkyl betaines (e.g., alkyldimethylamino acetic acid betaine) and imidazoline-type amphoteric activators. These antistatic agents may be used individually, or two or more thereof may be used in combination.

The pigments and dyes may each be an organic or inorganic pigment or dye, and examples thereof include carbon black, iron red, red lead, basic zinc chromate, chrome vermilion, cadmium red, rose red, brilliant carmine, brilliant scarlet, quinacridone red, lithol red, vermilion, thioindigo red, mingamiya red, chrome yellow, zinc yellow, yellow iron oxide, titan yellow, fast yellow, Hansa yellow, auramine lake, benzidine yellow, indanthrene yellow, beige pigments, titanium oxide, zinc sulfide, chromium oxide, chrome green, zinc green, chlorinated copper phthalocyanine green, phthalocyanine green, naphthol green, malachite green lake, ultramarine, iron blue, copper phthalocyanine blue, cobalt blue, phthalocyanine blue, fast sky blue, indanthrene blue, and azo-based pigments.

Further, in cases where the resin additive masterbatch of the present invention is used in an agricultural film, an ultraviolet absorber may be incorporated so as to control the crop growth; an infrared absorber may be incorporated so as to improve the heat-retaining property; and/or an anti-clouding agent or an anti-fogging agent may be incorporated because fogging may occur inside greenhouse or dew condensation may occur on the film surface to prevent sufficient amount of light from reaching the crops.

The polyolefin resin composition of the present invention in which the resin additive masterbatch of the present invention is added can be used in a variety of applications, for example, automobile resin components such as bumpers, dash boards, instrument panels, garnishes, front pillar covers, side roof covers, center pillar covers, radiator grills, side mud guards, aero-parts and side protectors; resin parts for home electric appliances such as refrigerators, laundry machines and vacuum cleaners; household articles such as tablewares, buckets and bath goods; resin parts for connection, such as connectors; miscellaneous goods such as toys; storage containers such as tanks and bottles; medical molded articles such as medical packages, syringes, catheters and medical tubes; building materials such as wall materials, flooring materials, window frames and wall papers; wire coating materials; agricultural materials such as greenhouses and tunnels; molded articles including films and sheets, such as food packaging materials (e.g., wraps and trays); and fibers.

EXAMPLES

The present invention will now be described in more detail by way of examples thereof. However, the present invention is not restricted by the following examples by any means.

Examples 1 to 17, Comparative Examples 1 to 6

Using: a polypropylene resin (NOVATEC MA3, manufactured by Japan Polypropylene Corporation) as component (A); a mixture of resin additives, which are the below-described Compound Nos. 1 and 2 (manufactured by ADEKA Corporation, melting point: 33° C.), and/or the below-described Compound No. 7 (manufactured by ADEKA Corporation, melting point: 62° C.) as component (B); talc (MICRO ACE P-6, manufactured by Nippon Talc Co., Ltd.), clay (S-BEN E, manufactured by Hojun Co., Ltd.) and/or hydrotalcite (DHT-4A, manufactured by Kyowa Chemical Industry Co., Ltd.) as component (C); Compound No. 15 as an aromatic metal phosphate represented by the above-described Formula (3); and the below-described Compound No. 27 and/or 2-(2'-hydroxy-5'-methylphenyl) benzotriazole (ADK STAB LA-32, manufactured by ADEKA Corporation) as a benzotriazole-based ultraviolet absorber represented by the above-described Formula (4) or (5), these materials were blended in accordance with the respective formulations shown in Tables 1 to 3 below and stirred for 20 minutes using a Henschel mixer.

Using a biaxial extruder (TEX 30α, manufactured by The Japan Steel Works, Ltd.), the resulting powders were granulated at a temperature of 230° C. to obtain pellets. The thus obtained pellets were each subjected to a storage stability test (clumping resistance test) under the below-described conditions. The results thereof are shown in Tables 1 to 3.

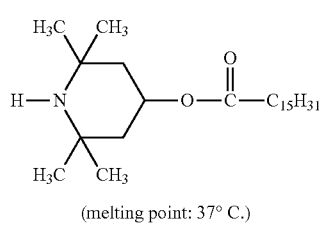

Compound No. 1

(melting point: 37° C.)

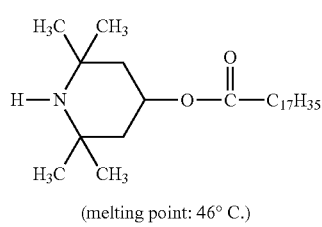

Compound No. 2

(melting point: 46° C.)

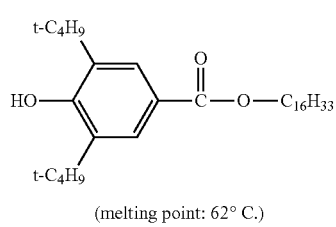

Compound No. 7

(melting point: 62° C.)

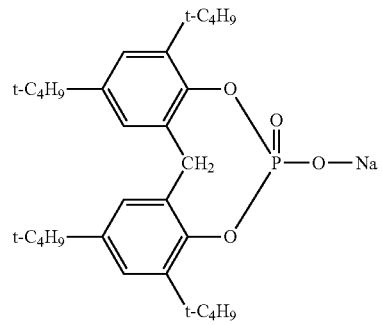

Compound No. 15

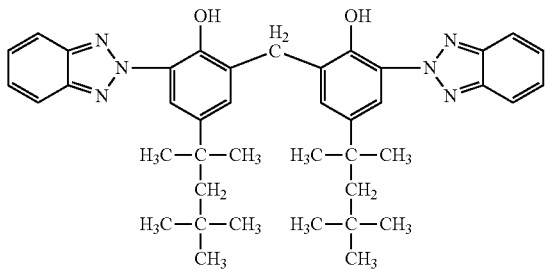

Compound No. 27

<Storage Stability Test (Clumping Resistance Test)>

In a glass sample vial having a base area of 12.6 cm$^2$, a height of 6 cm and a volume of 75 ml, 20 g of each of the thus obtained pellets was placed and stored in an incubator at 50° C. and 60° C. After one-week of storage, the sample vial was inverted and the clumping resistance was evaluated based on the falling state of the pellet. The evaluation criteria were as follows. The level 1 stands for the most excellent clumping resistance, followed by the levels 2, 3 and 4 with the level 5 being an evaluation given to the poorest clumping resistance.

Level 1: The pellet fell out of the sample vial when the sample vial was gently inverted.

Level 2: The pellet did not fall out of the sample vial under the condition of Level 1; however, when vibration was given to the inverted sample vial by dropping it onto a flat bench from a height of 5 mm, the pellet fell out.

Level 3: The pellet did not fall out of the sample vial under the condition of Level 2; however, when vibration was given to the inverted sample vial by dropping it onto a flat bench from a height of 30 mm, the pellet fell out.

Level 4: The pellet did not fall out of the sample vial under the condition of Level 3; however, when the bottom of the sample vial was tapped several times, the pellet fell out.

Level 5: The pellet did not fall out of the sample vial even under the condition of Level 4.

<Evaluation of Transparency (Haze)>

Next, the masterbatches obtained in Examples and Comparative Examples were each added to a resin, and the transparency was evaluated.

To 100 parts by mass of a polypropylene resin (NOVATEC MA3, manufactured by Japan Polypropylene Corporation), 0.3 parts by mass of each of the masterbatches obtained in Examples and Comparative Examples and 0.5 parts by mass of calcium stearate were added, and the resultant was mixed using a Henschel mixer (FM100, manufactured by Nippon Coke & Engineering Co., Ltd.). Then, a pellet was obtained using a biaxial extruder (TEX-30α, manufactured by The Japan Steel Works, Ltd.) at 230° C. From the thus obtained pellet, five sheet-form test pieces of 1 mm in thickness were prepared using an injection molding machine at 230° C. The thus obtained test pieces were left to stand in a 23° C., 60 RH % thermo-hygrostat chamber for at least 48 hours, and the transparency (haze) was measured using a transparency meter (HAZE GUARD 2, manufactured by Toyo Seiki Seisaku-sho Ltd.). The results thereof are also shown in Tables 1 to 3.

In these Tables, a smaller haze value represents superior transparency. Characters on a news paper placed underneath a test piece are readable when the haze value is 60 or less; however, they are not readable when the haze value exceeds 65.

TABLE 1

|  |  | Example |  |  |  |  |  |  |  |  |
|---|---|---|---|---|---|---|---|---|---|---|
|  |  | 1 | 2 | 3 | 4 | 5 | 6 | 7 | 8 | 9 |
| Component (A) | Polypropylene*[1] | 100 | 100 | 100 | 100 | 100 | 100 | 100 | 100 | 100 |
| Component (B) | ADK STAB LA-40*[2] | 50 | 100 | 150 | 200 | 30 | 70 | 100 | 100 | 100 |
|  | Compound No. 7*[3] | — | — | — | — | 70 | 30 | — | — | — |
| Component (C) | Talc | 15 | 15 | 15 | 15 | 15 | 15 | 15 | 15 | 15 |
|  | Clay | — | — | — | — | — | — | — | — | — |
|  | Hydrotalcite | — | — | — | — | — | — | — | — | — |
| Aromatic metal phosphate | Compound No. 15 | 1.2 | 1.2 | 1.2 | 1.2 | 1.2 | 1.2 | 1.0 | 1.2 | 3 |
| Benzotriazole-based ultraviolet absorber | Compound No. 27 | 3 | 3 | 3 | 3 | 3 | 3 | — | — | — |
|  | Compound*[4] | — | — | — | — | — | — | — | — | — |
| Clumping resistance (storage stability) | 50° C. | 1 | 1 | 1 | 2 | 1 | 1 | 1 | 1 | 1 |
|  | 60° C. | 1 | 1 | 2 | 3 | 1 | 1 | 2 | 2 | 1 |
| Transparency (Haze) |  | 59.7 | 59.5 | 59.0 | 59.0 | 59.8 | 59.7 | 59.6 | 59.5 | 59.0 |

TABLE 2

|  |  | Example |  |  |  |  |  |  |  |
|---|---|---|---|---|---|---|---|---|---|
|  |  | 10 | 11 | 12 | 13 | 14 | 15 | 16 | 17 |
| Component (A) | Polypropylene*[1] | 100 | 100 | 100 | 100 | 100 | 100 | 100 | 100 |
| Component (B) | ADK STAB LA-40*[2] | 100 | 100 | 100 | 100 | 50 | 100 | 100 | 100 |
|  | Compound No. 7*[3] | — | — | — | — | — | — | — | — |
| Component (C) | Talc | 15 | 15 | 15 | 15 | 15 | — | — | 10 |
|  | Clay | — | — | — | — | — | 15 | — | — |
|  | Hydrotalcite | — | — | — | — | — | — | 15 | 10 |
| Aromatic metal phosphate | Compound No. 15 | — | — | — | 1.2 | 1.2 | 1.2 | 1.2 | 1.2 |
| Benzotriazole-based ultraviolet absorber | Compound No. 27 | 1.0 | 5.0 | 10 | — | 1.5 | — | — | — |
|  | Compound*[4] | — | — | — | 3 | 1.5 | — | — | — |
| Clumping resistance (storage stability) | 50° C. | 2 | 2 | 2 | 1 | 1 | 1 | 2 | 1 |
|  | 60° C. | 2 | 2 | 2 | 2 | 1 | 2 | 2 | 1 |
| Transparency (Haze) |  | 59.7 | 59.7 | 59.6 | 59.3 | 59.1 | 59.6 | 58.0 | 58.2 |

TABLE 3

|  |  | Comparative Example |  |  |  |  |  |
|---|---|---|---|---|---|---|---|
|  |  | 1 | 2 | 3 | 4 | 5 | 6 |
| Component (A) | Polypropylene*[1] | 100 | 100 | 100 | 100 | 100 | 100 |
| Component (B) | ADK STAB LA-40*[2] | 100 | 100 | 100 | 100 | 100 | 50 |
|  | Compound No. 7*[3] | — | — | — | — | — | 50 |
| Component (C) | Talc | 7 | 30 | — | — | — | — |
|  | Clay | — | — | — | — | — | — |
|  | Hydrotalcite | — | — | — | — | — | — |
| Aromatic metal phosphate | Compound No. 15 | 1.2 | 1.2 | 1.2 | 1.2 | 1.2 | 1.2 |
| Benzotriazole-based ultraviolet absorber | Compound No. 27 | 3 | 3 | 3 | — | — | 3 |
|  | Compound*[4] | — | — | — | 3 | — | — |
| Clumping resistance (storage stability) | 50° C. | 2 | 1 | 3 | 3 | 3 | 3 |
|  | 60° C. | 4 | 1 | 4 | 4 | 4 | 4 |
| Transparency (Haze) |  | 59.0 | 65.5 | 55.0 | 55.7 | 56.0 | 56.2 |

*[1]: NOVATEC MA3, manufactured by Japan Polypropylene Corporation
*[2]: Mixture of Compound No. 1 and Compound No. 2, melting point: 33° C.
*[3]: Hexadecyl-3,5-di-tert-butyl-4-hydroxybenzoate, melting point: 62° C.
*[4]: ADK STAB LA-32, manufactured by ADEKA Corporation As seen from the results shown in the above Tables 1 to 3, in Examples according to the present invention, it was confirmed that a resin additive masterbatch yielding a pellet having excellent clumping resistance (storage stability) can be obtained. That is, it was confirmed that, even in a masterbatch pellet containing a low-melting-point resin additive at a high concentration in which clumping is likely to occur by nature, the clumping resistance can be improved by incorporating an inorganic layered compound. In addition, it was confirmed that, by selecting a specific amount of an inorganic layered compound, which is less than the amount of a resin additive incorporated as a main component, deterioration of the transparency of the resulting final resin product is inhibited. It is thus apparent that, by selecting the specific formulation composition of the present invention, a masterbatch comprising a low-melting-point resin additive at a high concentration, which has excellent clumping resistance and high versatility, can be provided.

Moreover, when the weather resistance of the pellets of Examples 2, 5 and 6 were evaluated using a sunshine weather meter (rain spray: 18 minutes per 120 minutes, black panel temperature: 63° C.), the pellets of Example 6 were found to have most excellent weather resistance.

The invention claimed is:

1. A resin additive masterbatch, characterized by comprising, with respect to 100 parts by mass of (A) a polyolefin resin:
   50 to 200 parts by mass of (B) a resin additive comprising at least one hindered amine and having a melting point of not higher than 65° C.; and
   10 to 20 parts by mass of (C) at least one inorganic layered compound selected from talc, mica, kaolin or hydrotalcite;
   at least one aromatic metal phosphate represented by the following Formula (3):

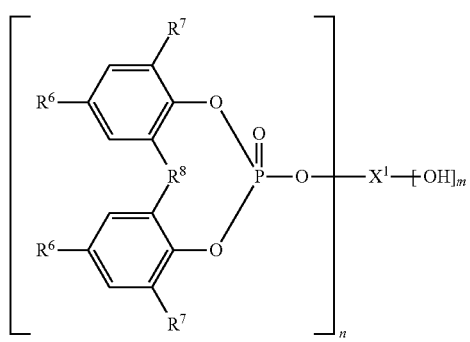

(3)

wherein $R^6$ represents a hydrogen atom or an alkyl group having 1 to 8 carbon atoms; $R^7$ represents an alkyl group having 4 to 8 carbon atoms; $R^8$ represents an alkylidene group having 1 to 4 carbon atoms; and $X^1$ represents an alkali metal atom, an alkaline earth metal atom or an aluminum atom, with provisos that: when $X^1$ is an alkali metal atom, n is 1 and m is 0; when $X^1$ is an alkaline earth metal atom, n is 2 and m is 0; and when $X^1$ is an aluminum atom, n is 1 or 2 and m is (3-n);
at least one benzotriazole-based ultraviolet absorber represented by the following Formula (4):

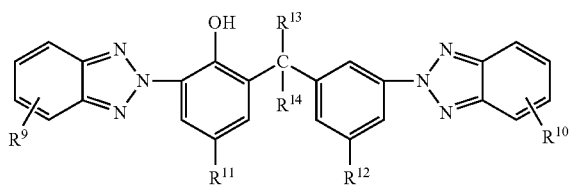

(4)

wherein, $R^9$ and $R^{10}$ each independently represent a hydrogen atom, a chlorine atom or an alkyl group having 1 to 4 carbon atoms; $R^{11}$ and $R^{12}$ each independently represent a hydrogen atom or an alkyl group having 1 to 18 carbon atoms; and $R^{13}$ and $R^{14}$ each independently represent a hydrogen atom or an alkyl group having 1 to 4 carbon atoms;
wherein said (B) resin additive having a melting point of not higher than 65° C. comprises at least one hindered amine compound represented by the following Formula (1) and at least one benzoate compound represented by the following Formula (2), and
the content ratio of said hindered amine compound(s) and said benzoate compound(s) is, in terms of mass ratio, in a range of 1:1 to 4:1:

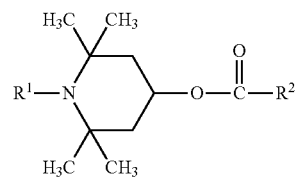

(1)

wherein $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 7 to 31 carbon atoms or an alkenyl group having 2 to 30 carbon atoms;

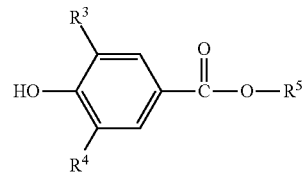

(2)

wherein, $R^3$ and $R^4$ each independently represent a hydrogen atom, an alkyl group having 1 to 12 carbon atoms or an arylalkyl group having 7 to 30 carbon atoms; and $R^5$ represents an alkyl group having 8 to 30 carbon atoms.

2. The resin additive masterbatch according to claim 1, wherein said (C) inorganic layered compound is talc.

3. A polyolefin resin composition, characterized by comprising the resin additive masterbatch according to claim 1 in a polyolefin resin.

4. The resin additive masterbatch according to claim 1, wherein the content ratio of said hindered amine compound(s) and said benzoate compound(s) is, in terms of mass ratio, in a range of 7:3 to 4:1.

5. The resin additive masterbatch according to claim 1, wherein an amount of the at least one aromatic metal phosphate represented by Formula (3) is 0.3 to 5 parts by mass and an amount of the at least one benzotriazole-based ultraviolet absorber represented by the following Formula (4) is 0.5 to 50 parts by mass.

6. The resin additive masterbatch according to claim 1, wherein an amount of the at least one aromatic metal phosphate represented by Formula (3) is 0.3 to 5 parts by mass and an amount of the at least one benzotriazole-based ultraviolet absorber represented by the following Formula (4) is 0.5 to 25 parts by mass.

7. The resin additive masterbatch according to claim 1, wherein an amount of the at least one aromatic metal phosphate represented by Formula (3) is 0.3 to 5 parts by mass and an amount of the at least one benzotriazole-based ultraviolet absorber represented by the following Formula (4) is 0.5 to 10 parts by mass.

8. The resin additive masterbatch according to claim 1, wherein an amount of the (C) at least one inorganic layered compound is 10 to 15 parts by mass, an amount of the at least one aromatic metal phosphate represented by Formula (3) is 1 to 3 parts by mass and an amount of the at least one benzotriazole-based ultraviolet absorber represented by the following Formula (4) is 1 to 10 parts by mass.

9. A resin additive masterbatch, characterized by comprising, with respect to 100 parts by mass of (A) a polyolefin resin:
   50 to 200 parts by mass of (B) a resin additive comprising at least one hindered amine and having a melting point of not higher than 65° C.; and
   10 to 20 parts by mass of (C) at least one inorganic layered compound selected from talc, mica, kaolin or hydrotalcite;
   at least one aromatic metal phosphate represented by the following Formula (3):

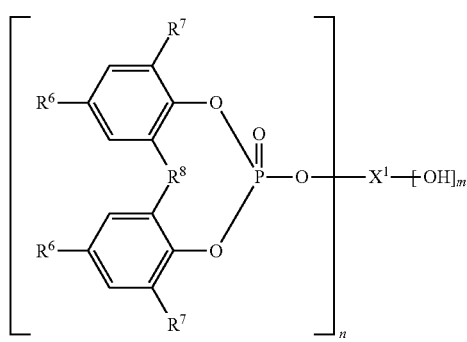

wherein $R^6$ represents a hydrogen atom or an alkyl group having 1 to 8 carbon atoms; $R^7$ represents an alkyl group having 4 to 8 carbon atoms; $R^8$ represents an alkylidene group having 1 to 4 carbon atoms; and $X^1$ represents an alkali metal atom, an alkaline earth metal atom or an aluminum atom, with provisos that: when $X^1$ is an alkali metal atom, n is 1 and m is 0; when $X^1$ is an alkaline earth metal atom, n is 2 and m is 0; and when $X^1$ is an aluminum atom, n is 1 or 2 and m is (3-n);
   at least one benzotriazole-based ultraviolet absorber represented by the following Formula (4):

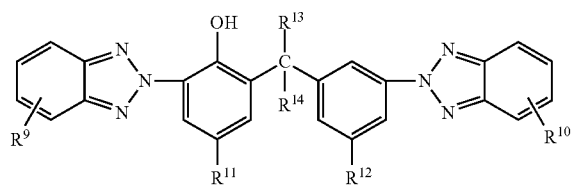

wherein, $R^9$ and $R^{10}$ each independently represent a hydrogen atom, a chlorine atom or an alkyl group having 1 to 4 carbon atoms; $R^{11}$ and $R^{12}$ each independently represent a hydrogen atom or an alkyl group having 1 to 18 carbon atoms; and $R^{13}$ and $R^{14}$ each independently represent a hydrogen atom or an alkyl group having 1 to 4 carbon atoms;
   wherein said (B) resin additive having a melting point of not higher than 65° C. comprises at least one hindered amine compound represented by the following Formula (1):

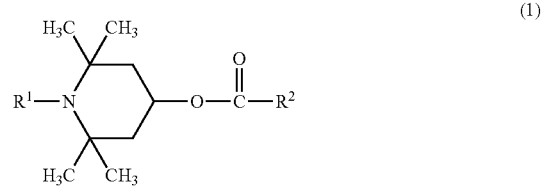

wherein $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 7 to 31 carbon atoms or an alkenyl group having 2 to 30 carbon atoms.

10. The resin additive masterbatch according to claim 9, wherein an amount of the at least one aromatic metal phosphate represented by Formula (3) is 0.3 to 5 parts by mass and an amount of the at least one benzotriazole-based ultraviolet absorber represented by the following Formula (4) is 0.5 to 50 parts by mass.

11. The resin additive masterbatch according to claim 9, wherein an amount of the at least one aromatic metal phosphate represented by Formula (3) is 0.3 to 5 parts by mass and an amount of the at least one benzotriazole-based ultraviolet absorber represented by the following Formula (4) is 0.5 to 25 parts by mass.

12. The resin additive masterbatch according to claim 9, wherein an amount of the at least one aromatic metal phosphate represented by Formula (3) is 0.3 to 5 parts by mass and an amount of the at least one benzotriazole-based ultraviolet absorber represented by the following Formula (4) is 0.5 to 10 parts by mass.

13. The resin additive masterbatch according to claim 9, wherein an amount of the (C) at least one inorganic layered compound is 10 to 15 parts by mass, an amount of the at least one aromatic metal phosphate represented by Formula (3) is 1 to 3 parts by mass and an amount of the at least one benzotriazole-based ultraviolet absorber represented by the following Formula (4) is 1 to 10 parts by mass.

* * * * *